April 13, 1926. Re. 16,320

J. L. TINDALL

WATER TUBE STEAM PRODUCER

Original Filed June 28, 1920 3 Sheets-Sheet 1

Inventor

Jerome L. Tindall,

By Prentiss, Stone & Boyden,

Attorneys

April 13, 1926. Re. 16,320

J. L. TINDALL

WATER TUBE STEAM PRODUCER

Original Filed June 28, 1920 3 Sheets-Sheet 2

Inventor
Jerome L. Tindall,
By Prentiss, Stone & Boyden,
Attorneys.

April 13, 1926. Re. 16,320

J. L. TINDALL

WATER TUBE STEAM PRODUCER

Original Filed June 28, 1920 3 Sheets-Sheet 3

Inventor

Jerome L. Tindall,

By Prentiss, Stone & Boyden,

Attorneys.

Reissued Apr. 13, 1926. Re. 16,320

UNITED STATES PATENT OFFICE.

JEROME L. TINDALL, OF PUEBLO, COLORADO.

WATER-TUBE STEAM PRODUCER.

Original No. 1,412,904, dated April 18, 1922, Serial No. 392,312, filed June 28, 1920. Application for reissue filed November 27, 1922. Serial No. 603,645.

*To all whom it may concern:*

Be it known that I, JEROME L. TINDALL, a citizen of the United States, residing at the city of Pueblo, county of Pueblo, and State of Colorado, have invented a new and useful Water-Tube Steam Producer, of which the following is a specification.

My invention relates to improvements in water tube steam producers in which there are three major sections situate with relation to one another so that there is a saving of the heat and a complete and efficient circulation is provided in all the water tubes of the system. The water enters these sections through the economizer section and then passes to the steam producer section and thence to the superheating section.

My objects in this form of water tube steam producer are, first, to arrange the passages for the water through the tubes of the steam producer in such a way that the circulation will be entirely free and unhampered; second, that the heating surface be so arranged that the heat will be absorbed with the minimum loss; third, that a minimum of space and weight be required for the steam producer; fourth, to provide a steam producer that may be more cheaply constructed and with superior efficiency; fifth, to provide means for removing salts and sediment from the water in the water tubes of the steam producer. I attain these objects by means of the water tube appliances illustrated in the accompanying drawings, in which:—

Similar letters and similar numerals refer to similar parts throughout the several views.

Figure 1:
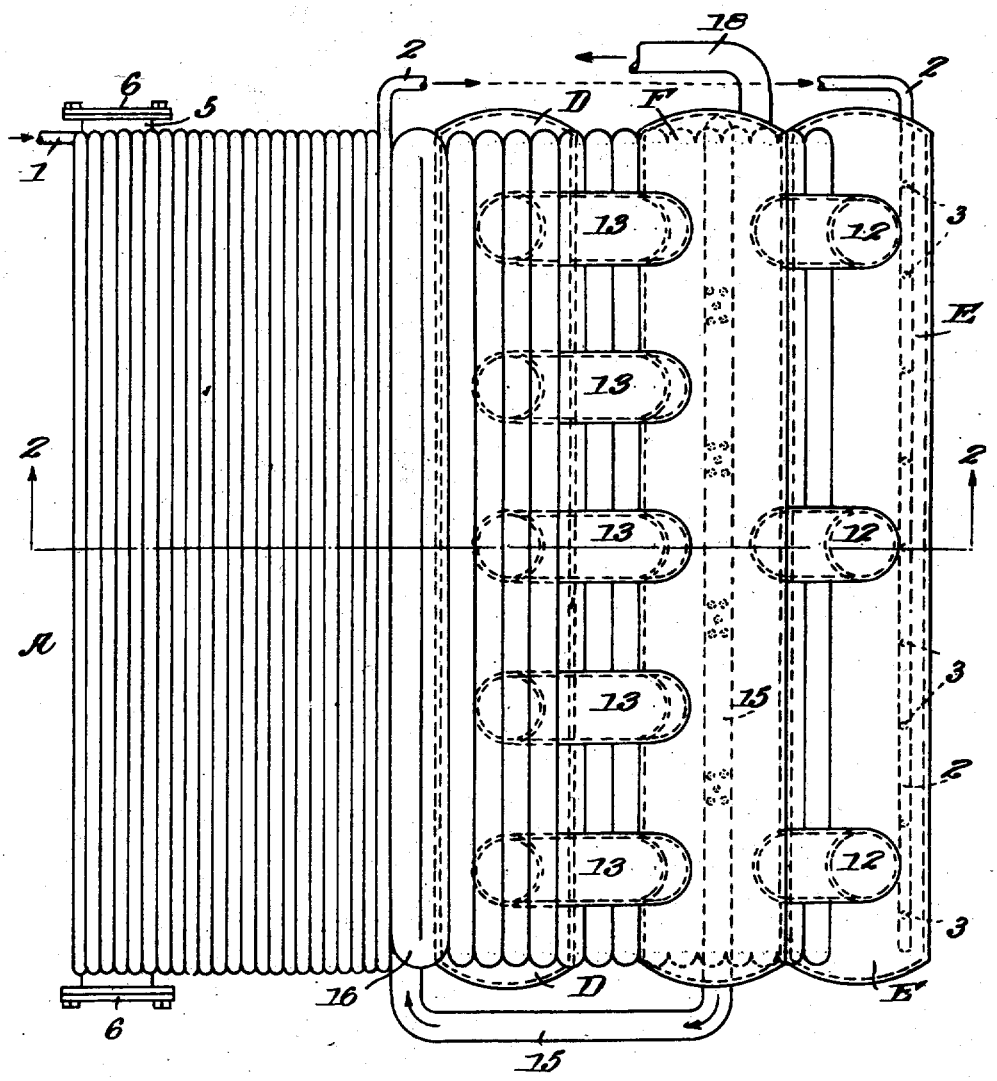
Figure 1, is a plan view of the water tube steam producer, not showing the housing or jacket or the burner.
Figure 2:
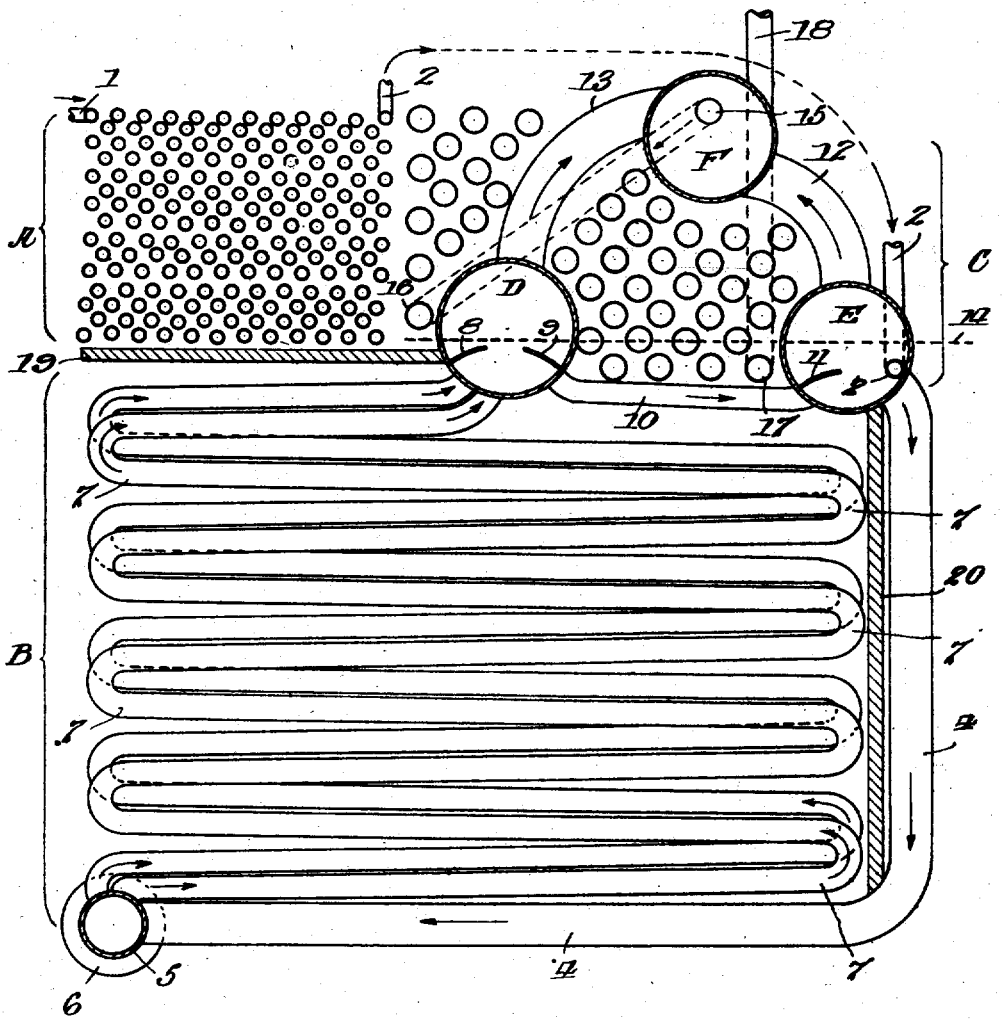
Figure 2 is a vertical sectional view of the water tube steam producer on the line 2—2 of Fig. 1.
Figure 3:
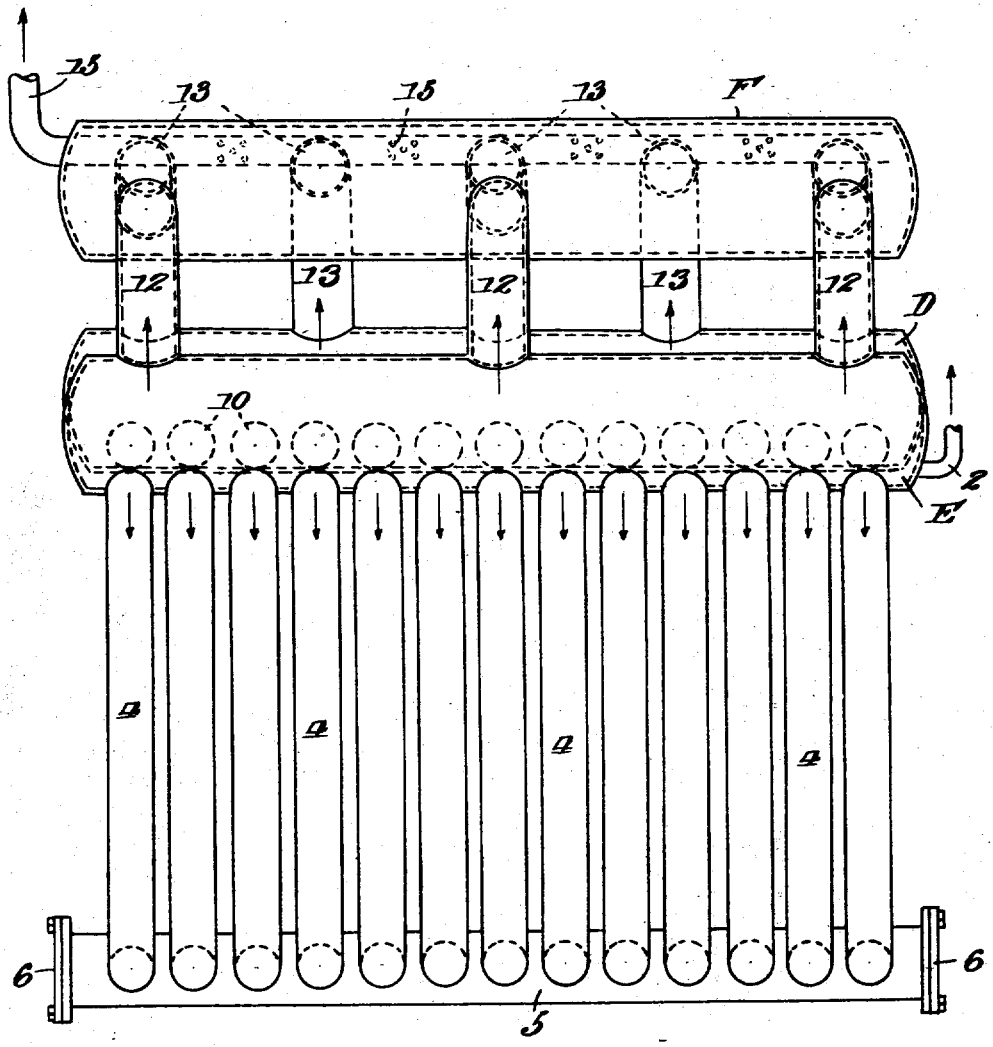
Figure 3 is an elevation looking at the right side of Fig. 1.

The economizer section A consists of a system of small horizontal water tubes bent to extend back and forth, and assembled to conform to a rectangular space near the flue or vent for the hot gases and is so placed and constructed as to absorb the remaining heat from the escaping warm gases. This system of tubes is welded together in one continuous line of tubing. The feed water is delivered to the economizer section from the feed water pumps through the tube 1, and after passing through the economizer system is delivered through tube 2, to the steam generating section B. This tube 2 passes longitudinally through a large horizontal cylinder E, and is closed at its extreme end. Within the cylinder E, the tube 2 has a multiplicity of outlets 3, 3, which open into the ends of a series of relatively large downward-extending tubes 4, 4, which tap the side of cylinder E, pass horizontally under the rest of the pipes of the steam generating section B, and empty into a horizontal common header pipe or distributor 5. This distributor 5 is provided at each end with flanged caps 6, removably attached to enable one to clean out the deposited salts and débris that may be precipitated from the heated water. From the distributor 5 the water gradually rises by passing forth and back through the gradually inclined zig-zag tubes 7, 7, of the steam generating section B, and enters the horizontal steam and water separating cylinders D and E. The upper ends of the zig-zag generating tubes are set into the cylinder D, and extending between the cylinders D and E are a series of substantially horizontal cross tubes 10, which tap the lower portion of said cylinders, and serve, in effect, to connect the tubes 7 with cylinder E. Just above the open ends of tubes 7 and 10, in cylinder D, are placed inwardly extending, curved deflector plates, 8, 9, and a similar deflector plate 11 is located in cylinder E, above the open ends of tubes 10. The deflector plates 8 and 9, in the cylinder D, and the deflector plate 11 acting with the projecting side of the tube 2, in cylinder E, tend to direct the water across their respective cylinders and cause it, when relieved of its steam which escapes up between said deflectors, to descend again downwardly through the tubes 4, 4, to the distributor.

The water level is maintained in the water tube steam producer at a point near the dotted line 14, and a little above the deflector plates 8, 9, and 11, and above the cross tubes 10.

It is plain, that when the steam escapes between the deflector plates 8, 9, the water from which it escapes will pass downwardly and horizontally through the cross tubes 10 to the separating cylinder E, where it is relieved of the rest of its steam, and then has a tendency to flow downwardly in the pipes 4.

The steam is forced upwardly through pipes 13 and 12, from the separating cylinders D and E, respectively to a steam reserve cylinder F, located above the other two.

Located between generating and economizer sections is a horizontal baffle plate or shield 19, which extends from the outer side of the steam producer to the cylinder D, thus preventing the products of combustion from passing directly up through the economizer section from below, and compelling the hot gases to flow up through the space between the two cylinders D and E, and around the superheating tubes, hereinafter described, before reaching the economizer section. Thus, the economizer is caused to absorb as much as possible of the heat remaining in the gases after they have passed the superheater and as they are about to be forced through the furnace outlet or flue. A vertical baffle 20 is placed between the generating tubes 7 and the return flow tubes 4, to protect the feed water in the tubes 4 from being excessively heated, so that its specific gravity will be enough greater than the waters in the tubes 7 to maintain the normal and uninterrupted circulation therein.

A tube 15 has its upper end tightly inserted into the end of the steam reserve cylinder F, and that part within F, has numerous perforations for admitting the steam. The tube 15 extends downwardly to the point 16 where it connects with one end of the superheating section C, which consists of a continuous line of tubing bent back and forth to form a bank of horizontal tubes extending at right angles to the generating tubes 7, and occupying the space between the cylinders D, E and F, and also the space above cylinder D. The wet steam flows from reserve cylinder F through the tube 15, to and through the superheater, passing out at the point 17 to the pipe 18, which connects with the engine.

One of the purposes in having the superheater section away from the hottest gases of the furnace is to prevent its pipes from getting too hot, as the superheated dry steam will not readily protect the pipes as water or wet steam will. I am aware that prior to this invention water tube steam producers have been invented and used, and therefore I do not claim broadly the system of water tube steam boilers, but, I claim:

1. A water tube steam-producing appliance of the class described, comprising in combination, two tubular sections, the first section disposed at the outlet of the furnace gases, and provided to absorb the remaining heat by contact of the gases with the numerous small horizontal tubes containing the cool water from the supply pipe, the second section comprising numerous horizontally disposed pipes in tiers and provided to generate the steam by contact with the hottest gases of the furnace, two large horizontally-disposed cylinders situate above said second section and extending parallel with the tubes of the first section, which is over one end of the second section, one of said cylinders being over the opposite end of the second section from the first section and the other located near the first section, the space between said cylinders being the passage for the hot gases from the second section to the first section, a baffle shield extending horizontally under the first section and over the end of the second section and into contact with the side of the nearest cylinder provided to conduct the bot gases from the second section up between said cylinders, and an upright baffle shield extending downwardly from the under side of the other cylinder.

2. In a water tube steam producer of the class described, having three distinct sections in the system, comprising an economizing section at the water supply end of the connected series and a steam generating section situate at the under side of the system, and a superheating section above the second section, the combination of an end cylinder, and a central cylinder, forming part of the generating section, and an upper cylinder, forming part of the superheating section, a baffle shield extending downwardly from the said end cylinder provided to conduct the hot gases up between the end cylinder and the central cylinder, a baffle shield extending horizontally from the central cylinder between the first section and the second section provided to conduct the hot gases from the second section up between said end cylinder and said central cylinder to the superheating section and said upper cylinder, connecting tubes provided to conduct the water from the side of the central cylinder to the lower side of the end cylinder, downwardly extending tubes having their intake in the side of said end cylinder, a header pipe at the bottom of the second section communicating with said downwardly extending tubes for distributing the water received from said downwardly extending tubes to the steam generating section, and deflector plates in said end cylinder, just below the water surface therein, provided for the escape of the steam and for the deflecting of the water back into the circulation of the said second section.

3. In a water tube steam producing system of the class described, the combination with a rectangular steam producing section composed mostly of inclined water tubes and a common header pipe, and an economizer section of horizontally disposed pipes above one end of the steam producing section and with its pipes extending transversely to those of the under section, of a superheating section located above the opposite end of the steam producing section, and comprising an upper cylinder and a plurality of horizontally disposed steam pipes, said steam producing section also comprising a central cylinder and an end cylinder, all of said cylinders extending transversely to the water tubes of the steam producing section, a baffle shield extending downwardly from the said end cylinder, and a baffle shield extending horizontally from the said central cylinder and under the economizer section and both baffles provided to conduct the hot gases up between the said end cylinder and the said central cylinder to the superheating section, the central cylinder being placed a little above the plane of the end cylinder, the tubes of the steam producing section entering the central cylinder, cross pipes conducting the water from the central cylinder to the end cylinder, deflectors extending toward each other from the inside of the central cylinder below the water surface and provided to direct the water toward the said cross pipes and to allow the steam to escape from between said deflectors upwardly, through a connecting steam pipe to the said upper cylinder which is the steam reserve cylinder, a deflector extending from the inside of the end cylinder and provided to direct the flow of water from said cross pipes downwardly into pipes connecting with said header pipe, steam connecting pipes connecting the end cylinder with the said upper cylinder, and a perforated small tube longitudinally secured within said upper cylinder and connected with an outlet pipe conducting the dry steam from it to the said horizontally-disposed superheater pipes in direct train to the engine.

4. In a steam producing system of the class described, the combination with a steam producing section comprising a central cylinder and an end cylinder, and baffle shields provided to conduct the hot gases through the space between said cylinders to a certain location above said section, of a superheating section located adjacent said cylinders and the outlet from said baffle shields and comprising an upper cylinder and interlocated steam pipes extending parallel with said cylinders, a feed-water pipe conducting the water and entering into one end of the end cylinder and being closed at its extremity and having holes in its side provided to allow the feed-water to pass into the end of downwardly extending pipes entering the said end cylinder and the ends of said pipes registering with the holes in said feed-water pipe, cross tubes having their intake within said central cylinder and their outlets in said end cylinder, deflector plates extending toward each other from the inner faces of the said central cylinder and provided to allow the steam in said central cylinder to escape from the water and serving to deflect the current of hot water toward the intake ends of said cross tubes, steam pipes provided to conduct the steam from said end cylinder and said central cylinder to said upper cylinder, a wet-steam pipe extending longitudinally into one end of the upper cylinder near its upper wall and having numerous small holes provided as outlets for the wet steam from the upper cylinder through the said wet-steam pipe to the said horizontally-disposed steam pipes provided for the super-heating of the wet steam.

5. A water tube steam producing appliance of the class described, comprising, in combination, two tubular sections, one section comprising a series of substantially horizontal continuous return bend tubes in contact with the hottest gases of the furnace, and serving as a steam generator, a pair of horizontally disposed separating cylinders, spaced apart and situate above the generating section, said cylinders being connected with each other and with the tubes of the generating section, and a feed-water heating section disposed at the outlet of the furnace gases, and comprising a number of small horizontal tubes serving to absorb the remaining heat from the escaping gases, said feed-water heating section being located over one end of the generating section, one of said cylinders being disposed over the opposite end of said generating section, and the other being located near the feed-water section, and means for causing the hot gases leaving the generating section to pass upwardly between said two cylinders, and thence around and between the tubes of the water heating section, before reaching the furnace outlet.

6. In a water tube steam producer of the class described, having three distinct sections in the system, comprising an economizing section at the water supply end of the connected series and a steam generating section situate at the lower side of the system, and a superheating section above the second section, the combination of a pair of spaced, horizontal separating cylinders connected with and forming part of the generating section, and a steam cylinder forming part of the superheating section located above the separating cylinders, and connected therewith, superheater tubes arranged in the space bounded by said three cylinders and connected with said steam cylinder, and means for causing the hot gases leaving the generating section to first pass upwardly between said separating cylinders and envelope said superheating tubes and steam cylinder, and then flow through the economizing section before reaching the furnace outlet.

7. In a steam producing system of the class described, the combination with a generating section, comprising a bank of substantially horizontal, continuous, return bend generating tubes, and a pair of separating cylinders, of a superheating section disposed above the said generating section, and comprising a series of horizontal tubes and a steam cylinder connected therewith, all of said cylinders extending horizontally and being arranged in relatively widely spaced relation, the upper ends of said generating tubes being connected directly with one of said separating cylinders, a series of parallel cross tubes connected at one end with the said last mentioned separating cylinder, and at the other end with the other separating cylinder, whereby fluid from said generating tubes may flow through one cylinder into the other, and means connecting each of said separating cylinders independently with the said steam cylinder.

8. In a water tube steam producer the combination with a horizontally extending separating cylinder, a steam cylinder disposed above and parallel with said separating cylinder, and communicating therewith, and superheater tubes connected with said steam cylinder and lying partly between said cylinders, of a horizontal header pipe, a bank of continuous zig-zag inclined generating tubes connected at their lower ends with said header pipe and in communication at their upper ends with said separating cylinder, a plurality of parallel return flow pipes tapping the side of said separating cylinder and distributed therealong, said return flow pipes extending downwardly from said cylinder to said header pipe, and also tapping the side of the latter, means for causing the hot products of combustion which pass around said generating tubes to come in contact with said cylinders and superheater tubes, and means protecting the said return flow pipes from direct contact with such products.

In testimony whereof I affix my signature.

JEROME L. TINDALL.